(12) United States Patent
Sadakuni

(10) Patent No.: US 6,446,056 B1
(45) Date of Patent: Sep. 3, 2002

(54) INTERACTIVE ARTIFICIAL INTELLIGENCE

(75) Inventor: Naoki Sadakuni, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/394,369

(22) Filed: Sep. 10, 1999

(51) Int. Cl.$^7$ ................................. G06N 3/02
(52) U.S. Cl. .................... 706/14; 345/157; 345/473; 345/730
(58) Field of Search ................. 345/157, 473, 345/734; 434/267; 704/1; 705/1; 707/1, 2; 706/14

(56) References Cited

U.S. PATENT DOCUMENTS

| | | | |
|---|---|---|---|
| 5,682,469 A | * 10/1997 | Linnett et al. | 345/473 |
| 5,852,819 A | * 12/1998 | Beller | 707/1 |
| 5,870,730 A | 2/1999 | Furuya et al. | |
| 5,999,895 A | * 12/1999 | Forest | 704/1 |
| 5,999,908 A | * 12/1999 | Abelow | 705/1 |
| 6,005,549 A | * 12/1999 | Forest | 345/157 |
| 6,034,652 A | * 3/2000 | Freiberger et al. | 345/730 |
| 6,048,209 A | * 4/2000 | Bailey | 434/267 |
| 6,085,183 A | 7/2000 | Horn et al. | |
| 6,195,651 B1 | * 2/2001 | Handel et al. | 707/2 |
| 6,219,657 B1 | 4/2001 | Hatayama | |

FOREIGN PATENT DOCUMENTS

| | | |
|---|---|---|
| JP | 10-328422 | 12/1998 |
| JP | 11-126017 | 5/1999 |

* cited by examiner

Primary Examiner—Wilbert L. Starks, Jr.
(74) Attorney, Agent, or Firm—Knobbe, Martens, Olson & Bear, LLP

(57) ABSTRACT

Behavior of a device is modified based on the device's experience. The device includes: (i) a sensing unit for sensing signals; (ii) a concern-generating unit programmed to generate concern-parameters; (iii) an actuating unit for actuating the device; and (iv) a memory storing a spreadsheet composed of multiple sets of data, each set corresponding to an event defined by signals received by the device, variations in its concern-parameters, and behavior of the device. When the device has variations in its concerns in a situation, the device extracts from the memory an event, if any, to best compensate for the variations to select behavior in the situation. The selected behavior may be adjusted by variations in its emotions. The behavior of the device is regulated by variations in its concerns, and the device can modify or improve its behavior based on the stored information obtained in the past.

11 Claims, 13 Drawing Sheets

INTERACTIVE ARTIFICIAL INTELLIGENCE

BACKGROUND OF THE INVENTION

1. Field of the Invention

The present invention relates to a method for adjusting behavior of a device, and particularly to a method for adjusting the behavior based on the device's experience.

2. Description of the Related Art

Conventionally, various controlling methods have been available for controlling a device in accordance with a user's demand.

In such controlling methods, normally, the user sets a target value at output which the user wants, and the device is controlled in such a way that the output matches the target value, while feeding the output back to a control system which compares the feedback and the target value to adjust the output. In the above, by feeding the output back to the system to adjust the output, the output of the device to be controlled can approach the target value, thereby achieving control satisfying the user's preference.

However, the above control system may not be appropriate in an area where the user can develop emotions such as companionship toward a device. Such a device includes toys, games, communication tools, search tools, and other tools and devices subjected to personal use. Further, if a target value is not determinable due to the system's complexity or lack of information, the conventional control system does not work.

Furthermore, if a device senses numerous pieces of information, it is difficult to sort them out and use them as useful information to act thereon. If the device is operated solely in accordance with the user's command, the above may not be a problem. However, for an autonomic device which acts without the user's command, it is important to obtain meaningful information.

SUMMARY OF THE INVENTION

A general objective of the present invention is to provide a control system which enables a device to autonomously modify its behavior or performance through interaction with its external environment, i.e., based on its experience. That is a self-development system. The control system can generate pseudo-emotions which are used as a parameter for controlling behavior. The control system can collect information on an object of its own concern, and can store the information and update it by itself. This autonomous behavior system is advantageous, especially when applied to robots, toys, or games. The present invention has exploited a real-time basis behavior-adjusting system.

An embodiment of the present invention is a method for adjusting behavior of a device based on the device's experience. The device comprises: (i) a sensing unit for sensing signals; (ii) a concern-generating unit programmed to generate concern-parameters; (iii) an actuating unit for actuating the device; and (iv) a memory storing a spreadsheet composed of multiple sets of data, each set corresponding to an event defined by signals received by the device, variations in its concern-parameters, and behavior of the device. The method comprises steps of: (a) sensing signals receivable by the device; said device having concern-parameters ($C_i$) (i=entry number or time) which vary from predetermined standards (SC); (b) extracting from the memory an event, if any, to best compensate for the variations in its concern-parameters; and (c) actuating the device based on the extracted information, and then computing variations in its concern-parameters ($\Delta C_i$), thereby updating the memory. Accordingly, when the device is in a situation, the device recalls (extracts) memory relevant to the situation based on variations in its concern-parameters. The behavior of the device is regulated by variations in its concern-parameters, and the device can modify or improve its behavior based on the information obtained in the past.

In the above, in an embodiment, the device further comprises an emotion-generating unit programmed to generate emotion-parameters, and wherein, in step (a), the device has variations in its emotion-parameters, and in step (c), behavior of the device extracted from the memory is modified by the variations in its emotion-parameters under predetermined rules. By adjusting the behavior of the device based on variations in its emotion-parameters, the device can behave based on not only variations in its concern-parameters but also on current variations in its emotion-parameters, so that more complex and natural behavior of the device can be realized.

In the above, in an embodiment, updated memory stores variations in its concern-parameters ($\Delta C'_i$) linked with the event, wherein $\Delta C'_i = \alpha \Delta C_i + (1-\alpha) \Delta C'_{i-1}$ ($0 < \alpha < 1$), wherein $\Delta C'_{i-1}$ is the previous data saved under the index of the event. Accordingly, the memory needs one column for one event and can reduce its capacity. Further, the influence of new experience can be controlled to moderate the behavior changes.

In an embodiment, the relevancy of data stored in the memory can be determined as follows: The concern-generating unit comprises a plurality (p) of concern modules, each differently programmed to generate and output the concern-parameters ($C(n)_i$) (n=1–p), and, in step (b), the best compensating event is selected if the relevancy calculated based on the difference between the initial variation ($SC(n) - C(n)_i$) and the recorded variation ($\Delta C'(n)_{i-1}$) in each concern-parameter is higher than a pre-selected score, wherein the relevancy is defined by $\Sigma((SC(n)-C(n)_i)-\Delta C'(n)_{i-1})^2$ (n=1–p). The equation defining the relevancy is not limited to the above and can be of any type which is selected depending on the user's preference. In step (b), if no data on the event is extracted from the memory, the device can behave under predetermined rules.

Preferably, the control system further comprises a working memory which temporarily pools and stores information from the sensing unit and the concern-generating unit, in the first-mentioned memory until the device completes its action, and which outputs information to the concern-generating unit, the actuating unit, and the first-mentioned memory. Accordingly, processing becomes efficient.

The concern-parameters and the emotion-parameters can have any labels and definitions. For example, the concern-parameters can represent "safety", "affection", "hunger", and "play", respectively, and the emotion-parameters can represent "happy", "angry", "surprised", "sad", "fearful", and "disgust", respectively. The term "needs" can be a synonym for the concerns. The definition of each label can be predetermined. The number of concern-parameters and the number of emotion-parameters are not limited. The larger the number of parameters, the more complex the behavior becomes. If an object-oriented language program, such as JAVA and C++, is used for parameter control, new labels can be automatically created, so that new behavior can be generated accordingly.

A device controlled by the above control system can behave autonomously and improve behavior based on its experience.

The present invention can be applied to a method as well as an apparatus. Further, the system need not be an integrated system, but can be composed of plural separate units. That is, by networking plural devices or by using a separable medium (CD or IC card), an individual device can be downsized without losing memory and programming capacities.

DETAILED DESCRIPTION OF THE PREFERRED EMBODIMENT

The control system for controlling a device using emotion-parameters of the present invention (referred to as "control system") will be explained with reference to embodiments indicated in the figures.

Basic Control System

In an embodiment of the present invention, an agent or device comprises: (i) an external/internal condition recognition unit, (ii) a concern-generating unit, (iii) an emotion-generating unit, (iv) a long-term memory, (v) a working memory, (vi) a behavior planning unit, and (vii) an actuating unit. The above is a conceptual or functional structure, and need not be a physical structure; that is, these units need not be separately provided, but can be integrated. Further, each unit can be disposed in a device, but can also be disposed separately from the device.

Figure 1:
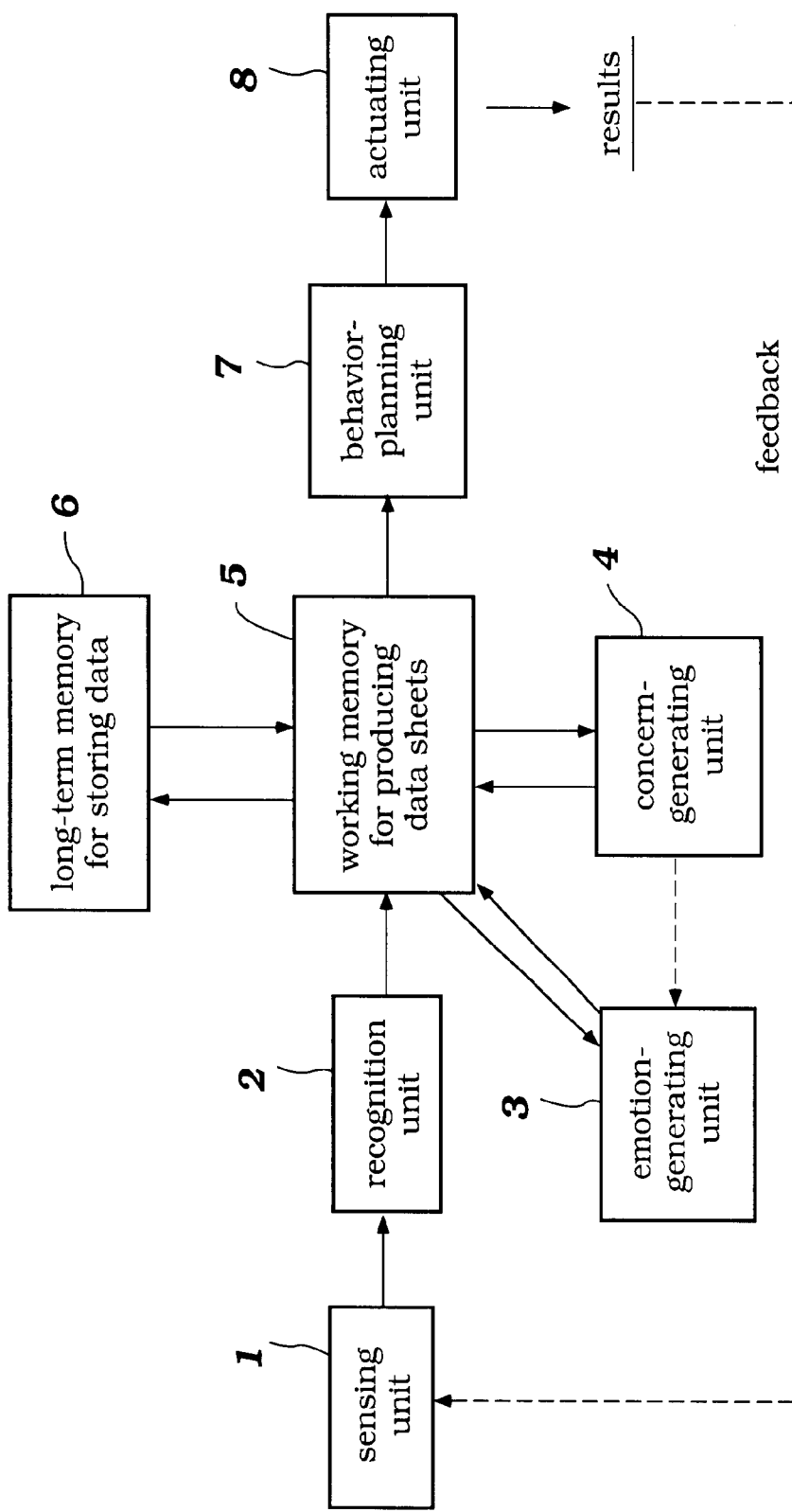
FIG. 1 is a diagram showing an embodiment of the entire control system according to the present invention.

FIG. 1 is a diagram showing an embodiment of the entire control system according to the present invention. As described above, this is a conceptual or functional structure, but not a physical structure.

In the embodiment of FIG. 1, an autonomic device comprises a sensing unit 1, a recognition unit 2, an emotion-generating unit 3, a concern-generating unit 4, a working memory 5 for producing data sheets, a long-term memory 6 for storing data, a behavior planning unit 7, and an actuating unit 8. The sensing unit 1 senses various signals including external and internal information. External information includes visual, tactile, auditory information, and electrically transmitted signals, and internal information includes battery level and malfunction signals. The sensed signals are inputted into the recognition unit 2 which analyzes the signals to generate meaningful information which includes characterization and identification of an event. This recognized information is inputted into the working memory 5 for producing data sheets. The concern-generating unit 4 is programmed to generate concern-parameters in response to the recognized information. The concern-parameters are not limited and may include "safety", "affection", "hunger", "study", and "play". The recognized information need not be all information but at least a piece of information (pre-selected) recognized at the recognition unit 2. Each concern-parameter is regulated independently of or harmoniously with each other. Each concern-parameter may include a time factor; that is, the value of each concern-parameter changes with time (some of them fade with time while others increase with time). Further, each concern-parameter may have its own predetermined function and fluctuate accordingly. The concern-generating unit 4 receives a signal from the working memory 5, which signal indicates whether or not the concern at issue is satisfied. The concern-generating unit 4 outputs a signal of concern to the working memory 5 for producing data sheets. The emotion-generating unit 3 is programmed to generate emotion-parameters in response to the recognized information and the generated concern-parameters. This recognized information need not be all but part of the information (pre-selected) recognized at the recognition unit 2, and may be different from that used at the concern-generating unit 4. The emotion-parameters are not limited but may include "happy", "angry", "surprised", "sad", "fearful", and "disgust". Each emotion-parameter is regulated independently of or harmoniously with each other. Each emotion-parameter may include a time factor; that is, the value of each emotion-parameter changes with time (some of them fade with time while others increase with time). Further, the emotion-parameters are generated when receiving information from the working memory 5 and signals from the concern-generating unit 4. The emotion-generating unit 3 outputs signals of emotions to the working memory 5 for producing data sheets. The long-term memory 6 is for storing data when the working memory 5 produces a final data sheet and inputs it to the long-term memory 6. The final data sheets are pooled and rearranged under the index of the event in the long-term memory 6 so that data can be retrieved as necessary. The data from the working memory 5 updates the long-term memory 6. In an embodiment, the working memory 5 can be omitted, and the long-term memory 6 can also function as the working memory 5, or vise versa. In the above, the term "event" means that, in a situation, the device observes an object and interacts with the object to modify its concern-parameters. In an embodiment, the woriking memory 5 can be omitted, and the long-term memory 6 can also function as the working memory 5, or vise versa. In another embodiment, the working memory 5 can be omitted, and each of the emotion-generating unit 3 and the concern-generating unit 4 can include a memory and can be connected to each other and to the other units.

As described above, the working memory 5 receives signals from the recognition unit 2, the emotion-generating unit 3, the concern-generating unit 4, and the long-term memory 6 to produce data sheets (algorithms will be explained later). In the working memory 5, a data sheet may indicate an event, which includes an object and current situation surrounding the device recognized by the recognition unit 2, current concerns, which are generated by the concern-generating unit 4, and current emotions, which are generated by the emotion-generating unit 3. Variations in the concern-parameters when previously encountering the event, which are extracted from the long-term memory 6, can be but need not be indicated in the data sheet in the working memory 5. Variations in the concern-parameters stored in the long-term memory 6 are effectively used for finding an event to best compensate for the current variations in the concern-parameters, so that the device can select an action which may be most appropriate in the situation to modify the concern-parameters. Based on these data, the behavior-planning unit 7 decides on a pattern of behavior and outputs a signal to the actuating unit 8. At the behavior planning unit 7, a behavior pattern may be modified based on current emotions which are obtained by the emotion-generating unit 3; that is, behavior is selected based on the data on the event extracted from the long-term memory 6, and is modified based on the current emotions. Patterns of behavior are not limited but may include "approach", "attack", "avoid", "explore", and "random". If the device has various movable parts such as a tail, ears, hands, and eyebrows, various patterns of behavior can be formed. In the above, for a simple device, behavior can be selected without referring to the current emotions, and the emotion-generating unit 3 can be omitted.

Upon action by the actuating unit 8, the result is sensed by the sensing unit 1; that is, the result is fed back to the device. For example, as a result of approaching the object, if the device was hit, that impact is sensed by the sensing unit 1 and inputted into the working memory 5 via the recognition unit 2 where the impact is converted to variations in its concerns. The data sheet for this event in the working memory 5 is complete upon inputting the variations in its concerns. This data sheet is provided to the long-term memory 6 and updates the data therein. After one data sheet is complete (one event is over) and stored in the long-term memory 6, the device proceeds to a new event.

Basic Data Flow

Figure 2:
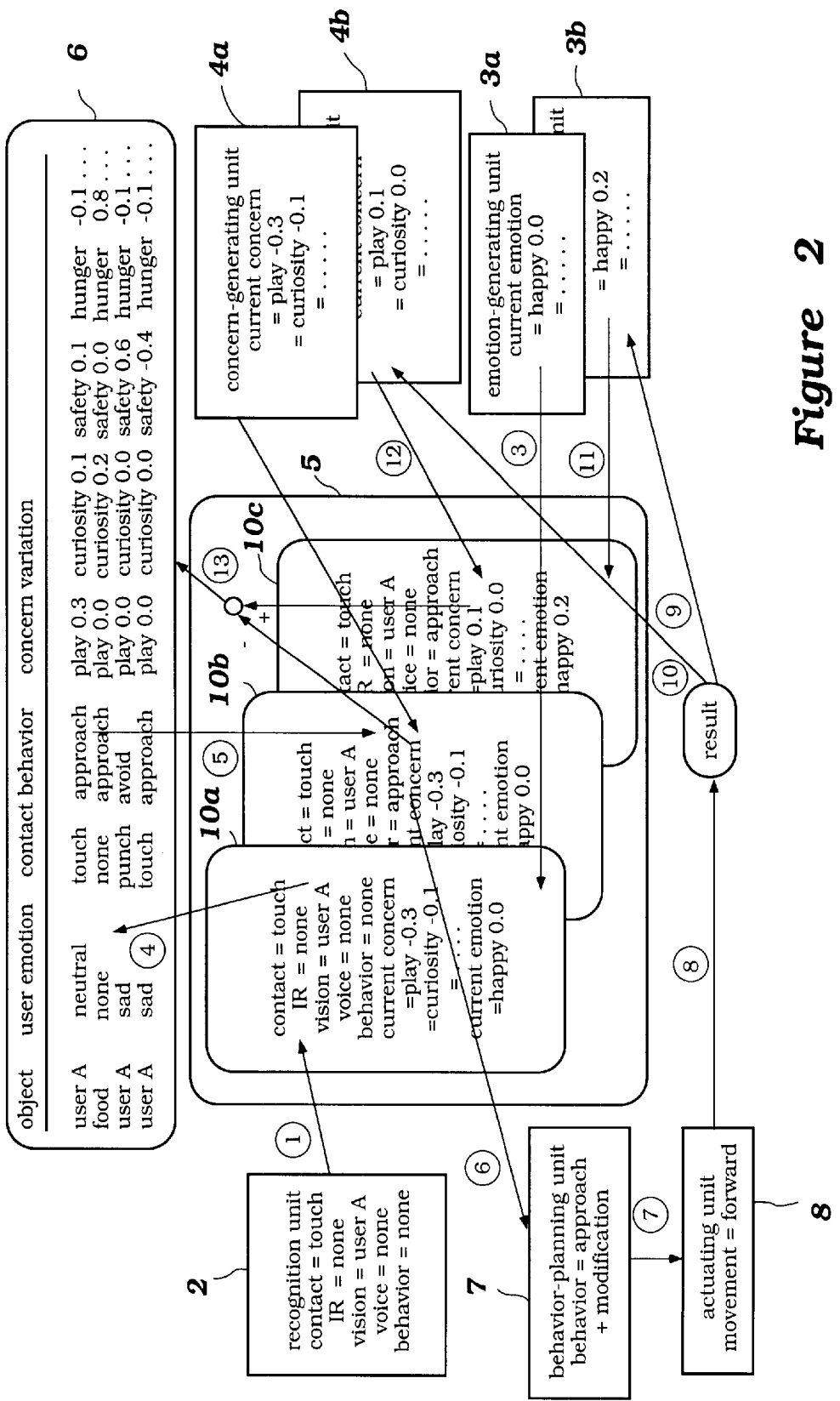
FIG. 2 is a diagram showing data flow and processing flow of an embodiment according to the present invention.

FIG. 2 is a schematic diagram showing data flow and processing flow of an embodiment according to the present invention. The processing order indicated in the figure is a simple suggestion and can be modified in the absence of material alteration. In this figure, first, the external/internal environment recognition unit (recognition unit) 2 outputs information (e.g., CONTACT=TOUCH; IR (infrared sensor)=NONE; VISION=USER A, VOICE=NONE) to the working memory 5 which indicates the information on a data sheet 10a. The information is derived from the sensing unit 1 and shows that the device is being touched, there is no obstacle in front of the device, the device is seeing user A, and the device is hearing no voice. The data sheet 10a includes items "CONTACT", "IR", "VISION", "VOICE", "BEHAVIOR", "CURRENT CONCERN", and "CURRENT EMOTION". These items are simply an example and can be selected depending on the types of sensors and recognition systems. In the data sheet 10a, "CONTACT", "IR", "VISION", and "VOICE" are updated using the information (current status) from the recognition unit 2. Based on information on "VISION" and "VOICE", it is possible to determine the user's emotion. The "user" can be defined by motion, color, and voice, or simply by an electronic name tag.

The current status is inputted into the concern-generating unit 4 and the emotion-generating unit 3. The concern-generating unit 4 is programmed to generate concern-parameters (explained later), and here, "play" (−0.3) has the highest intensity of its needs among the concern-parameters (e.g., "play", "safety", "hungry", etc.). The emotion-generating unit 3 is programmed to generate emotion-parameters (explained later), and here, "happy" is zero. In the above, satisfaction standards for all of the concerns are zero, and negative values indicate insufficiency (i.e., the concern is in need) and positive values indicate sufficiency.

Second, the working memory 5 includes the information (PLAY=−0.3, CURIOSITY=−0.1, etc.) as "CURRENT CONCERN" provided by the concern-generating unit 4.

Third, the working memory 5 includes the information (HAPPY=0.0, etc.) as "CURRENT EMOTION" provided by the emotion-generating unit 3.

Fourth, the information (CONTACT=TOUCH, IR=NONE, VISION=USER A, VOICE=NONE, PLAY=−0.3, CURIOSITY=−0.1, etc.) is inputted to the long-term memory 6 to find an event which may best compensate for the current needs. The long-term memory 6 has a spreadsheet wherein data are stored under the indices of events. Here, the events are defined by "OBJECT", "USER EMOTION", "CONTACT", and "BEHAVIOR". The user's emotion can be determined simply by "VOICE", or by a facial expression recognition system (described later). "CONCERN VARIATION" is recorded under the indices of events to link variations in the concerns with the events. Various data storage systems can be adapted in the long-term memory. Here, the memory stores data after every event. For example, in an event, when user A whose emotion appears to be neutral is touching the device, the device approaches user A, resulting in variations in the concerns, "PLAY" 0.3, "CURIOSITY" 0.1, "SAFETY" 0.1, etc. In another event, when user A who appears to be sad is touching the device, the device approaches user A, resulting in variations in the concerns, "PLAY" 0.0, "CURIOSITY" 0.0, "SAFETY" −0.4, etc.

Fifth, from the long-term memory 6, data stored under the index of the event are extracted. Extraction can be conducted in various ways. If the data sheet includes more information or items, data can be extracted under plural indices. For example, data can be collected under indices of "USER A", "TOUCH", and "APPROACH", or an event can be defined by a single index, "USER A", and data can be collected under the index. The current emotion can be used as one of the indices to define each event. In data sheet 10a, variations in the concerns are "PLAY −0.3", "CURIOSITY −0.1", etc. in a situation where the device is seeing user A, sensing no voice, being touched, and no obstacle is detected. Based on the information, the device can assume that the event is that the user A whose emotion appears to be neutral is touching the device, and the device needs "PLAY 0.3", "CURIOSITY 0.1", etc. to compensate for the insufficiencies of the concerns. Under the index of this event, variations in the concerns which best compensate for the needs are searched for. Here, one event matching this situation is found and indicates that the device "approached" user A to obtain the variations in the concerns (BEHAVIOR=APPROACH): According to the recorded variations of the concerns for compensation, upon actuating the behavior (APPROACH), the device is expected to have "PLAY 0.0", "CURIOSITY 0.0", etc. which satisfy the standards for concerns. These expected concerns can be inputted to the data sheet in the working memory. The searching method can be performed in various ways (explained later).

Fifth, the information (BEHAVIOR=APPROACH) is inputted into the working memory 5 which updates "BEHAVIOR" under predetermined rules (data sheet 10b).

Sixth, the information (BEHAVIOR=APPROACH) is inputted into the behavior-planning unit 7 which updates "BEHAVIOR" under predetermined rules (data sheet 10b). Here, the information indicates that the device is being touched, there is no obstacle in front of the device, the device is seeing user A, and the emotion level (happy) of the device is zero (neutral). The behavior-planning unit 7 is programmed to determine a pattern of behavior based on these pieces of information. Here, the behavior-planning unit 7 selects "APPROACH" without modification by the emotion level (since the level is zero), and the direction is toward user A. The approaching speed may be dependent on the emotion level (e.g., the higher the level, the higher the speed becomes).

Seventh, the behavior-planning unit 7 outputs the information (BEHAVIOR=APPROACH, etc.) to the actuating unit 8. The actuating unit 8 receives information from the behavior-planning unit 7 or directly from the working memory 5, so that the actuating unit 8 can determine the direction of movement to achieve the task (APPROACH to USER A). Here, the actuating unit 8 determines "FORWARD". As a result, the device further approaches user A while user A is touching the device.

Eighth, the device receives a consequence of the action. Here, user A plays with the device by, e.g., patting the device in a predetermined way or talking to the device, to an extent greater than previously.

Ninth, as a result, the recognition unit 2 recognizes user A's reaction (this processing flow is not shown), and the emotion-generating unit 3 determines the emotion level as "HAPPY" 0.2". The emotion-generating unit 3 is programmed to generate emotion-parameters. There are various ways to determine "CURRENT EMOTIONS" (explained later).

Tenth, also, as a result, the recognition unit 2 recognizes user A's reaction (this processing flow is not shown), and the concern-generating unit 4 determines the concern levels as "PLAY 0.1", "CURIOSITY 0.0", etc. The concern-generating unit 4 is programmed to generate concern-parameters. There are various ways to determine "CURRENT CONCERN" (explained later).

Eleventh, the current emotions in the working memory are updated (data sheet 10c). These emotion levels will affect subsequent behavior.

Twelfth, the current concerns in the working memory are updated (data sheet 10c).

Thirteenth, the difference between the initial concern levels (PLAY −0.3, CURIOSITY −0.1, etc.) and the updated concern levels (PLAY 0.1, CURIOSITY 0.0, etc.) is calculated (e.g., (PLAY 0.1)−(PLAY −0.3)=(PLAY 0.4), i.e., $\Delta$PLAY=−0.4), and the information including other data on the data sheet 10c ("CONTACT=TOUCH", "IR=NONE", "VISION=USER A", "VOICE=NONE", "$\Delta$PLAY=0.4", etc.) is transmitted to the long-term memory 6 and stored as new data under the indices of the event. There are various ways to store the new data in the long-term memory 6 (explained later).

As a result of updating the long-term memory 6, the device will behave differently than it did previously. Here, the event (when the user A whose emotion appears to be neutral is touching the device, the device approaches user A if there is no obstacle) may be extracted from the long-term memory 6 when the device is in higher need of "PLAY", etc. because the variation in "PLAY" ($\Delta$PLAY) for this event increases from 0.3 to 0.4. In the above, in order to moderate the influence of the instant occurrence (here, "$\Delta$PLAY 0.4"), various methods can be applied so that the influence of the recorded occurrence (here, "$\Delta$PLAY 0.3") can be saved to a certain degree, thereby avoiding a sudden change in behavior. The above methods will be explained later.

In the above, the event can be retrieved solely under the index of the object (user A) or under fewer indices than the above. For example, if the event is retried under the index of the object, data stored under the index of the object in the long-term memory can be combined and averaged or processed under predetermined rules. There are various ways to select the best compensating event (explained later), and more complex behavior patters can be performed. That is, when the device is touched by user A and there is no obstacle, the device will approach user A at a low speed or will not move, depending on the manner of updating the long-term memory 6.

In the figure, many flows are omitted. For example, the concern-generating unit 4 may receive the information (CONTACT=TOUCH, etc.) from the working memory 5 to generate the current concerns and to determine a satisfaction level of each concern. Further, the emotion-generating unit 3 may receive the information from the concern-generating unit 4 and/or the recognition unit 2 in order to generate emotion-parameters.

Basic Flow Chart

Figure 3:
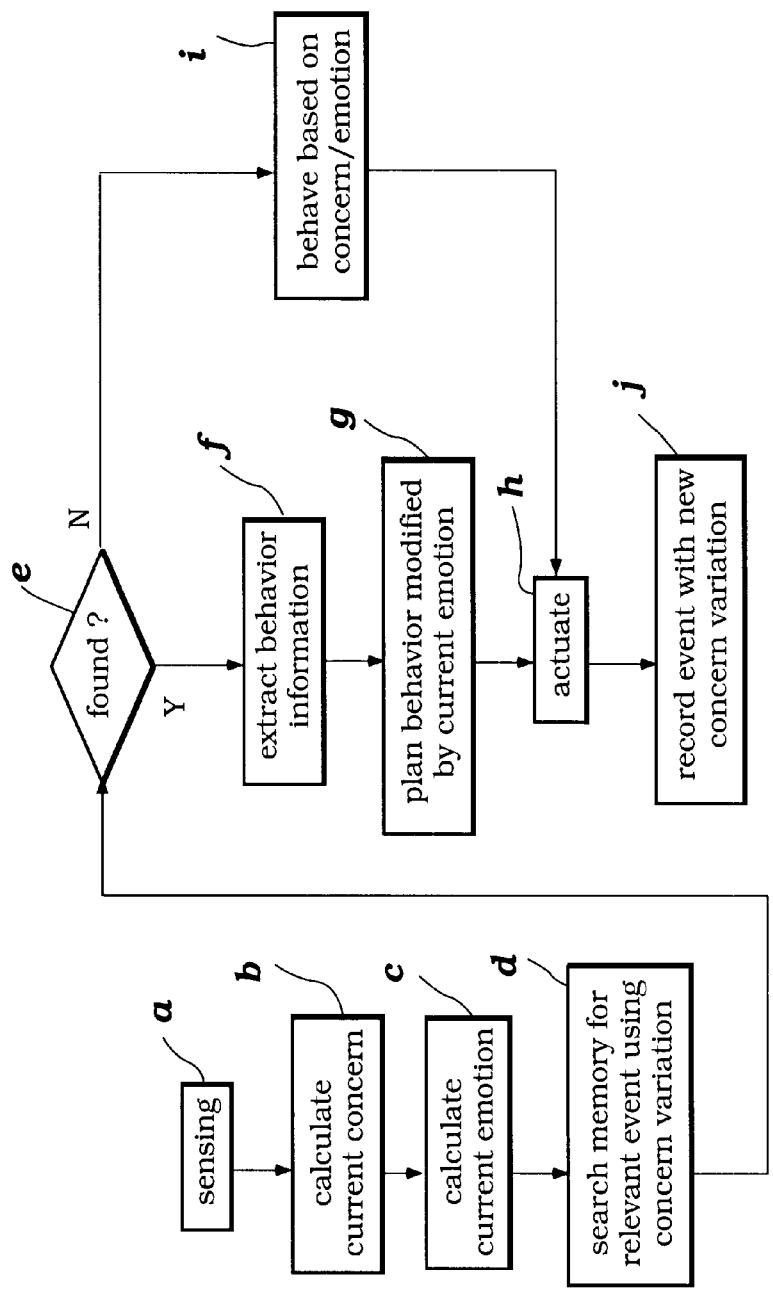
FIG. 3 is a flow chart diagram showing an embodiment of the control system according to the present invention.

FIG. 3 is a flow chart diagram showing an embodiment of the control system according to the present invention. As shown in FIG. 3, the device senses the external and internal environment (step a). The control system generates current concerns by the concern-generating unit (step b) and generates current emotions by the emotion-generating unit (step c). Based on the current concerns, variations in the concerns (deviations from the standards) to be compensated for are determined. Based on the variations in the concerns, the long-term memory is searched for an event relevant to the current event the device is now encountering (step d). The relevant event best compensates for the variations in the concerns. The control system checks if a relevant event is found (step e). If an event is found in the long-term memory, the control system extracts data on the event, especially behavior information (step f). Based on the behavior information, candidate behavior is selected by the behavior-planning unit, which candidate behavior is modified based on the current emotions (step g). The device is actuated based on the information from the behavior-planning unit (step h). In step e, if no event is found in the long-term memory, the behavior-planning unit generates commands based on the current concerns and/or emotions under predetermined rules (step i). The device is then actuated (step h). As a result, the device experiences consequences of the device's behavior. The consequence is sensed by the sensing unit and recognized by the recognizing unit, and then the data are recorded as a new event (if no previous relevant event was found) or the data updates the previous data (if a relevant event was found). In the above, the emotion-generating unit is not indispensable, and step c can be omitted, because the control system can be operated simply by variations in the concerns.

Sensing and Recognition Units

In an embodiment, the device may comprise a CCD camera as a visual detection means, a pressure-sensing sensor and an approach-sensing sensor as touch detection means, a microphone as a hearing-detection means, and an infrared sensor as an obstacle-detection means. The device may further comprise a battery capacity sensor which detects the remaining capacity of the battery. Alternatively, the device may comprise a radio wave signal receiver. By using these sensing means, the device detects objects, the environment, and internal conditions. Further, these sensors allow the device to detect the state of the user, such as a tone of voice, facial expressions, and gestures, and the operational environments where the device is used.

If the device is a robot, the CCD camera is installed on the top of the head and can be set in any direction via a universal joint. For example, the robot can be controlled in such a way that the robot automatically moves toward an object, such as a human or animal, which is a cause or source of information such as changes in temperature and sound. Image information such as facial expressions of the user and surrounding environments is supplied to a controller.

The pressure-sensing sensor may be installed in the lower front of the robot so that when the robot has actual contact with an obstacle, such information is provided to the controller.

The microphone may be installed on the side of the head of the robot, and provides information to the controller upon collecting sound/voices arose around the robot.

In the present invention, the sensed signals, i.e., primitive information, can be used directly, without further processing. For example, if a color is sensed, and if the control system is designed to work based on the color (an object is recognized simply by the color), no further processing is required. However, if the device is designed to respond to more than the color, the device needs to recognize more complex information and may require processing information. For example, based on the color, movement, and sound, the object can be recognized. Further, if complex recognition systems are used, the user's facial expression can be detected, the device can respond to the emotions of the user which are represented by the facial changes (Hanaya, et al., "An attempt of individual identification from face photographs", Technical Report of the Institute of Electronics, Information and Communication Engineers, CS96-123, IE96-92 (1996-12), pp. 55–60). A face neuron or neural network technology can be adapted.

In the present invention, for the purpose of simple experimentation, by using a radio wave detection sensor, the device can detect an object which possesses an identification tag transmitting identification information. The radio wave detection sensor can transmit radio waves and receive resonance signals emitted from the identification tag which has a particular resonance circuit. In addition, magnetic identification or bar code identification can be adapted. Further, a neural network can be used for recognizing an object based on the sensed signals.

Concern-Generating Unit

Figure 4:
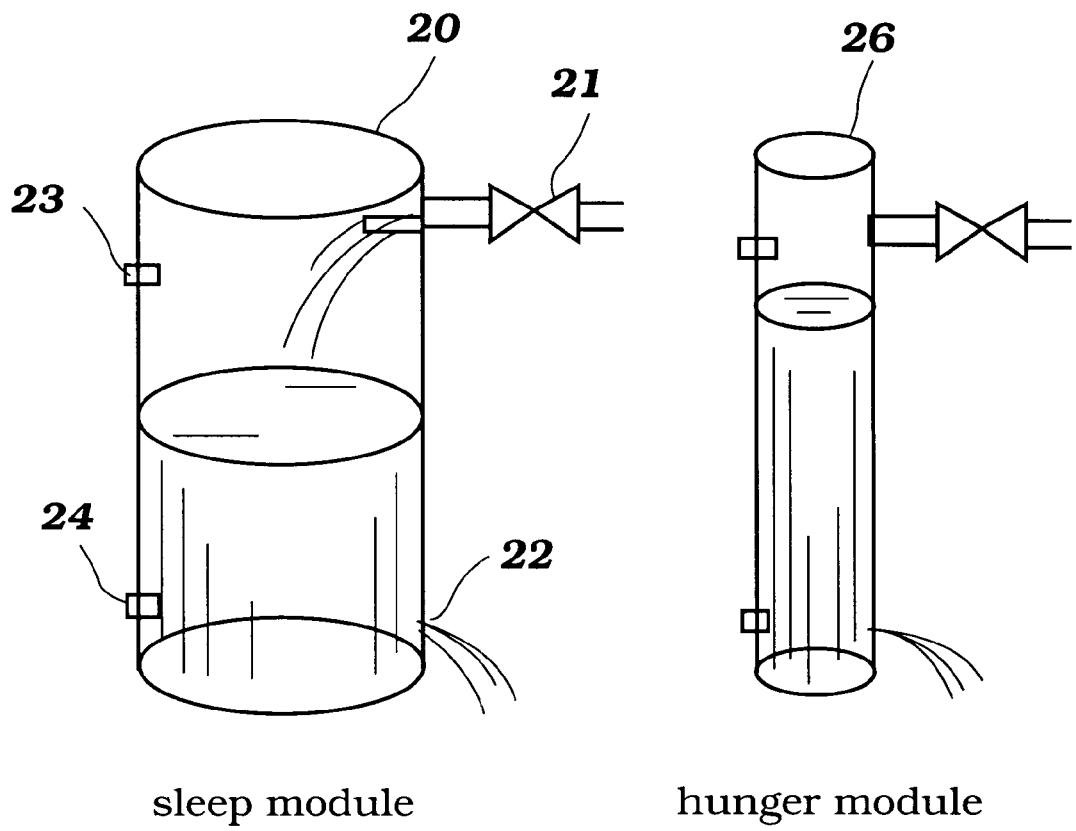
FIG. 4 is a diagram showing an embodiment of the above metaphoric tanks in the present invention.

The concern-generating unit is used for selecting an object of concern, so that the device can behave and collect data efficiently, and can improve its behavior quickly, without information overflow. The device can select an object by itself, without a user's command, so that the device can behave autonomously. The concern-generating unit can be independent from the external conditions or environment, and can be a function of its own equations. However, the concern-generating unit may be affected by the internal conditions such as battery level and the degree of satisfaction of each concern-parameter. Further, the concern-generating unit may have a time factor and change each concern-parameter with time. A change with time may occur in the direction of fading. The functions controlling each concern-parameter can be independent of each other, and they may create fluctuation cycles of each concern-parameter. For example, concern in "play" may fluctuate at predetermined intervals. The working memory may store data showing the number of occurrences of "play" and a degree of satisfaction, so that the concern-generating unit receives the data and modifies each concern-parameter. The working memory shown in FIG. 3 can include the item "capacity" which shows a level or degree of satisfaction, and, for example, when the consequent emotion is positive, the working memory outputs a signal to the concern-generating unit to raise the satisfaction level or degree. In general, the concerns are positioned at a higher level than the emotions, and the emotions are controlled by the concerns. However, the emotions can be one of the factors that modify the concerns. In an embodiment, $C=f(t, Cp)$ wherein C is a concern-parameter, f is a function, t is a time factor, and Cp is capacity. If each concern-parameter is metaphorically represented by contents in a tank, its satisfaction level can be represented by the level of the contents. FIG. 4 is a diagram showing an embodiment of the above metaphoric tanks. A tank 20 of "sleep" has a small hole 22 at the bottom, so that the contents 25 (concern-parameter) leaks with time. The tank has two level switches; a first switch is a lower switch 24 disposed at a lower part of the tank, which triggers opening a valve 21 to fill the tank with the contents (concern-parameter), and the other switch is a higher switch 23 disposed at a higher part of the tank, which triggers closing the valve 21 to stop filling the tank with the contents (concern-parameter). Even if the tank is full, the contents leak slowly with time, and eventually the lower switch will be activated. While the valve is open, new contents are introduced into the tank every time "sleep" is satisfied. The above mechanism can readily be realized in a program. If there are a plurality of concern-parameters, a plurality of tanks as above can be used, and the filling speed, the leaking speed, the positions of the lower switch and the higher switch can vary among the tanks (concern-parameters). In FIG. 4, a tank 26 of "hunger" is smaller than the tank 20 of "sleep". As described above, the concern-generating unit can readily be preprogrammed.

Figure 5:
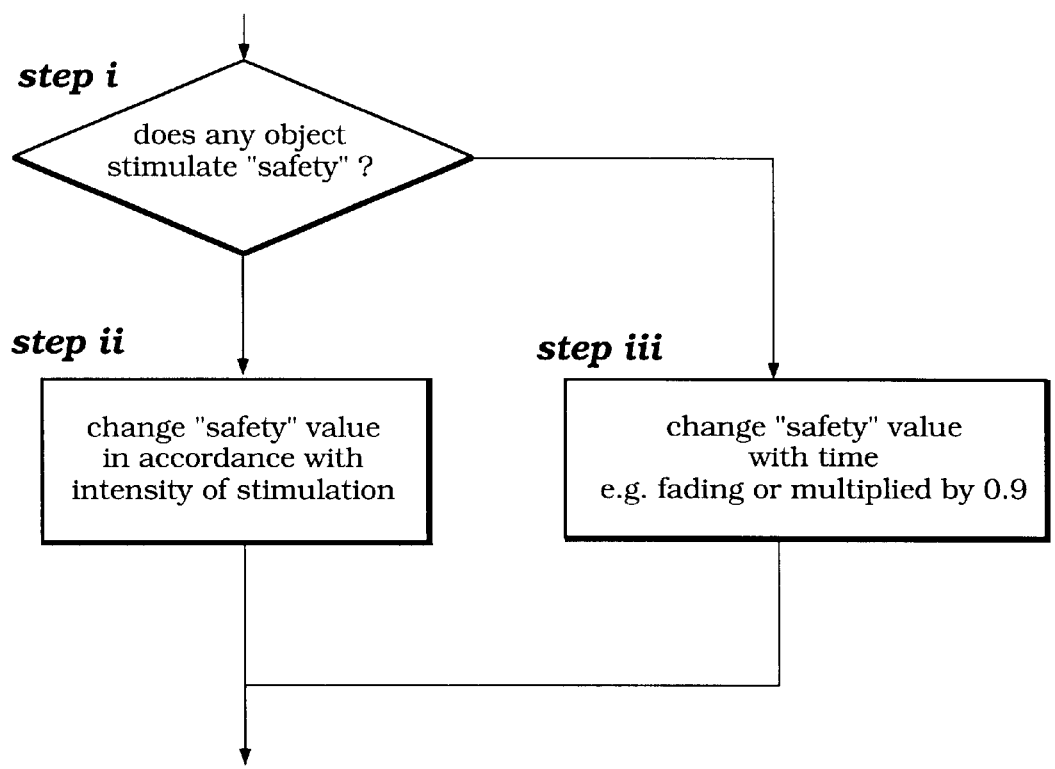
FIG. 5 is a diagram showing an embodiment of a flow chart showing time management flow in the present invention.

In another embodiment, changes with time can be achieved as shown in FIG. 5 which is a flow chart showing time management flow. In FIG. 5, if there is any signal stimulating "safety" (step i), the value of the concern-parameter is modified in accordance with the intensity of the stimulation (step ii). If there is no signal stimulating "safety" in step i, the value of the concern-parameter is modified under predetermined rules (step iii). In FIG. 5, the value of the concern-parameter is fading or is multiplied by 0.9.

Figure 6:
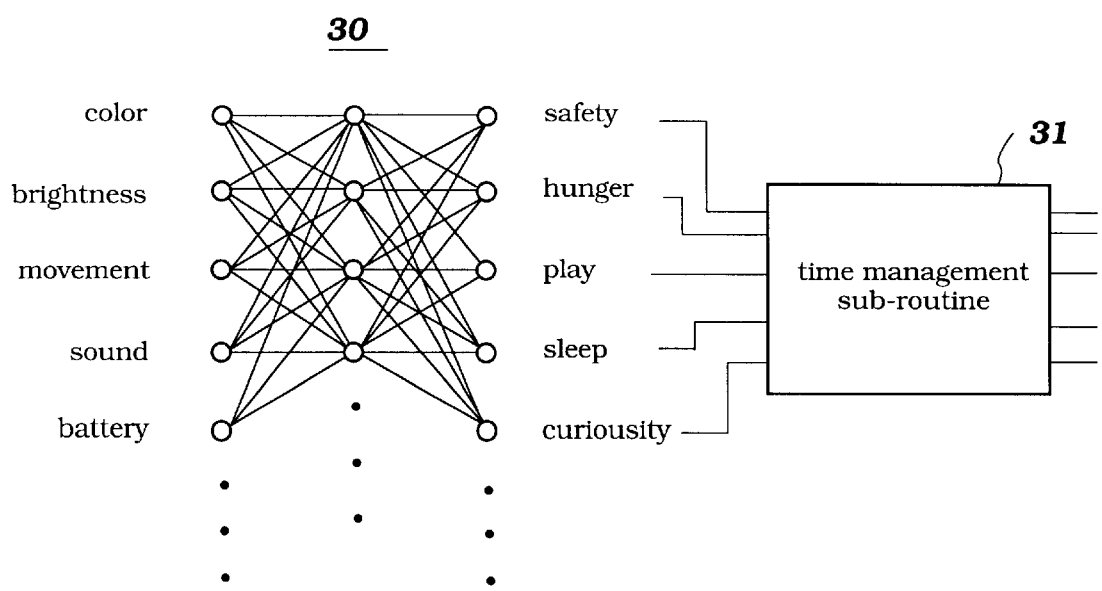
FIG. 6 is a diagram showing an embodiment of a neural network for the concern-generating unit in the present invention.

In another embodiment, the concern-generating unit can be established using a neural network by regulating a relationship between the recognized signals and the concern-parameters. FIG. 6 is a diagram showing an embodiment of a neural network 30 for the concern-generating unit. When using the neural network, each concern-parameter is related to one another. In addition, output of the neural network is connected to a time management sub-routine 31 to change each output with time. The time management can be conducted by activating the time factor (e.g., reducing 10%) at pre-selected time intervals or after every (or pre-selected number) running cycle(s) of a program.

The neural network can be established off-line or on-line. If it is conducted on-line, output of the device is fed back to the control system, and coupling coefficients can be adjusted. Further, coupling coefficients can be modified using evolutionary computing technology such as genetic algorithms and genetic programming. However, if on-line establishment is conducted, a "training" period will be required.

Further, the concern-generating unit can be constituted by a multi-dimensional map defined by the recognized signals and the concern-parameters.

The concern-generating unit may select one concern-parameter which has the lowest value among all of the concern-parameters at the time the concern-generating unit is called for. Selection of a concern-parameter can be conducted in various ways, including selection at random or under predetermined rules or functions.

Selecting and Recording Relevant Event

Figure 7:
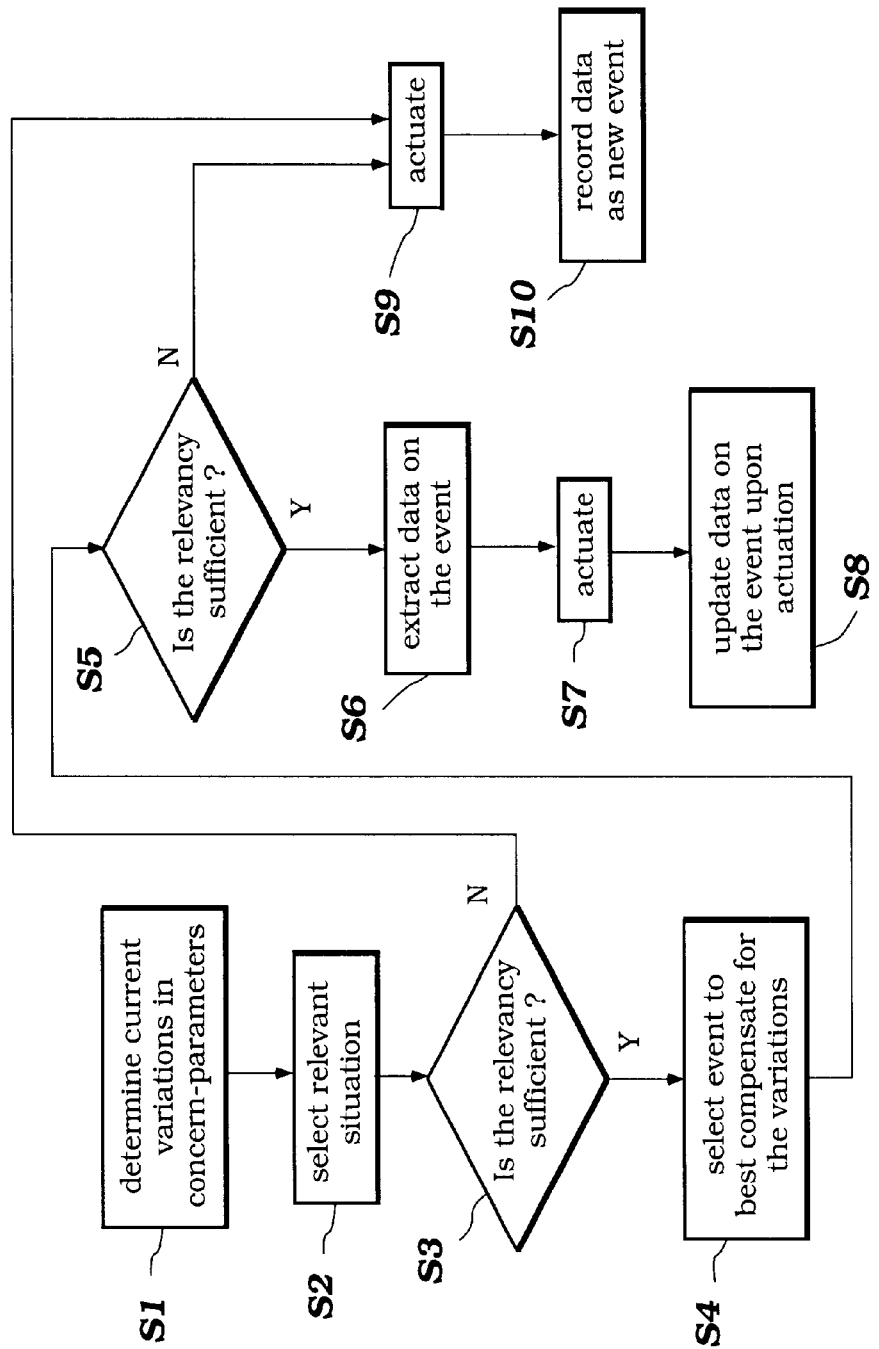
FIG. 7 is a flow chart diagram showing an embodiment of data extraction processing in the present invention.

FIG. 7 is a flow chart diagram showing an embodiment of selecting and recording an relevant event. As described above, the device determines variations in its concerns in a situation by the concern-generating unit (step S1). The situation is recognized by the recognition unit. In FIG. 2, the situation is that the device is seeing user A, hearing no voice, being touched, and seeing no obstacle. This situation can be interpreted as follows: User A whose emotion appears to be neutral is touching the device surrounded by nothing. If the situation is defined by all of the above, a specific event can be found in the long-term memory. The relevancy of the event is determined first by determining the relevancy of the situation (step S2). In an embodiment, the relevancy of the situation is determined on an element-by-element basis. In the above, if the situation is defined by all of the elements (e.g., user A, user's emotion, tactile sensation, obstacle), each element is compared with that of the current situation. In the above, some elements can be weighted heavily than others. For example, if "user A" is more important than "being touched", the element of "object" can be weighted more than "contact" by weighting the former with a factor. If there are plural elements (1 to p) of the situation at time i or data entry #i $(S(n)_i)$ $(n=1-p)$, the relevant situation is selected from the long-term memory if the relevancy calculated based on the difference between the current situation $(S(n)_i)$ and the recorded situation $(S(n)_{i-j})$ $(j<i)$ is higher than a pre-selected score, wherein the relevancy can be defined by, for example, the following:

$$\Sigma(S(n)_i - S(n)_{i-j})$$

$$\Sigma(S(n)_i - S(n)_{i-j})^2$$

$$\Sigma\{\beta_1 S(1)_i - S(1)_{i-j} + \beta_2(S(2)_i - S(2)_{i-j}) + \beta_3(S(3)_i - S(3)_{i-j}) + \}$$

$$\Sigma\{\beta_1(S(1)_i - S(1)_{i-j})^2 + \beta_2(S(2)_i - S(2)_{i-j})^2 + \beta_3(S(3)_i - S(3)_{i-j})^{2+}\}$$

wherein $\beta_1, \beta_2, \beta_3, \ldots$ are coefficients. The equation defining the relevancy is not limited to the above and can be of any type which is selected depending on the user's preference. The scoring system can be predetermined. For example, if user A is the user currently interacting with the device, user A in the memory is 1.0, user B is 0.5, and another object is 0.0. Similarly, if being touched is current contact, being touched is 1.0, being stroked is 0.8, being hit is 0.2, and no contact is 0.0. Further, if the user is more important than contact, $\beta$ for the user is larger than $\beta$ for the contact. The control system checks if the relevancy of the situation is higher than a predetermined level (step S3). If the relevancy of the situation is higher than the predetermined level, the relevancy of the concerns is then determined (step S4). In an embodiment, the relevancy of data stored in the memory can be determined as follows: The concern-generating unit comprises a plurality (p) of concern modules, each differently programmed to generate and output the concern-parameter $(C(n)_i)$ $(n=1-p)$, and, the best compensating event is selected if the relevancy calculated based on the difference between the initial variation $(SC(n)-C(n)_i)$ and the recorded variation $(\Delta C(n)_{i-1})$ in each concern-parameter is higher than a pre-selected score, wherein the relevancy is defined by, for example, the following:

$$\Sigma((SC(n)-C(n)_i)-\Delta C(n)_{i-1})$$

$$\Sigma((SC(n)-C(n)_i)-\Delta C(n)_{i-1})^2$$

$$\Sigma\{\beta_1(SC(1)-C(1)_i-\Delta C(1)_{i-1})+\beta_2(SC(2)_i-C(2)_i-\Delta C(2)_{i-1})+\ldots\}$$

$$\Sigma\{\beta_1(SC(1)-C(1)_i-\Delta C(1)_{i-1})^2+\beta_2(SC(2)_i-C(2)_i-\Delta C(2)_{i-1})^{2+\cdots}\}$$

wherein $\beta_1, \beta_2, \ldots$ are coefficients to weight some concern-parameters over the others. The equation defining the relevancy is not limited to the above and can be of any type which is selected depending on the user's preference. The control system checks if the relevancy of the concerns is higher than a predetermined level (step S5). If the relevancy of the concerns is higher than the predetermined level, the data, especially on behavior, are extracted from the long-term memory (step S6). The device is actuated based on the information extracted from the long-term memory (step S7). A consequence of the device's behavior is sensed by the sensing unit to determine variations in the concerns as a result of the behavior, thereby updating the long-term memory (step S8). There are various ways to record the data on the event (explained later). In step S5, if the relevancy of the concerns is lower than the predetermined level, or if the relevancy of the situation is lower than the predetermined level (i.e., if no data on the event is extracted from the memory), the device can behave under predetermined rules (step S9). Such default behavior can simply be "explore" or "random". A consequence of the behavior by the device is recorded as a new event. In FIG. 2, an event to best compensate for the variations in the concerns is found and suggests "APPROACH" to increase the "PLAY" level. As a result, although an increase of 0.3 is expected, "PLAY" increases of 0.4. This difference is recorded in the long-term memory.

In the above, if no event sufficiently relevant to the current event is found, the elements to define the situation can be restricted to one or more elements. For example, if user A is caressing the device, no situation may be found in the long-term memory. If the elements to define the situation are restricted to the "user" factor or if the "user" factor is highly weighted, the relevancy of the situation may satisfy the predetermined level. Further, if no specific situation is found in the memory, the control system checks if a superordinate situation can be found in the long-term memory to obtain a candidate behavior from the long-term memory.

Object Recognition

When the device has a new experience, that is, when no event is extracted from the long-term memory, the device can categorize an object or situation in order to record the new experience in the long-term memory. When the long-term memory suggest "user A" to play with, the device can recognize "user A", for example. User A can be defined by color, voice, face configuration, and/or name tag. Similarly, if the long-term memory suggests a "dark" and "quiet" place to "sleep", the place can be recognized. The term "dark" and "quiet" can be relative evaluation, and the device can find a relatively dark and quiet place among the objects the device is observing. The device is directed in a direction where values indicated by audio sensor and brightness sensor become lower. This relative evaluation can be performed easily. However, if the device observes a new object, the device cannot respond to it. For example, if "user A" is suggested, but the device does not observe user A in a predetermined period of time or until a change occurs in the concerns or emotions, an object the device observes can be selected as an object of concern. If the device does not observe user A but observes user B, the device may not recognize user B as an object of concern. If the objects are defined by genetic characteristics or loose rules such as a "moving" object making "sound", user A and user B can be an object of concern. After the device observes user B and while the device interacts with user B, the device can collect data on identification of user B by using the sensing unit. The data can be stored in the long-term memory and written in the spreadsheet under the index of user #2. Subsequently, when the device observes user #2 inputs data on a data sheet in the working memory, the device extracts data on user #2 from the long-term memory.

Figure 8:
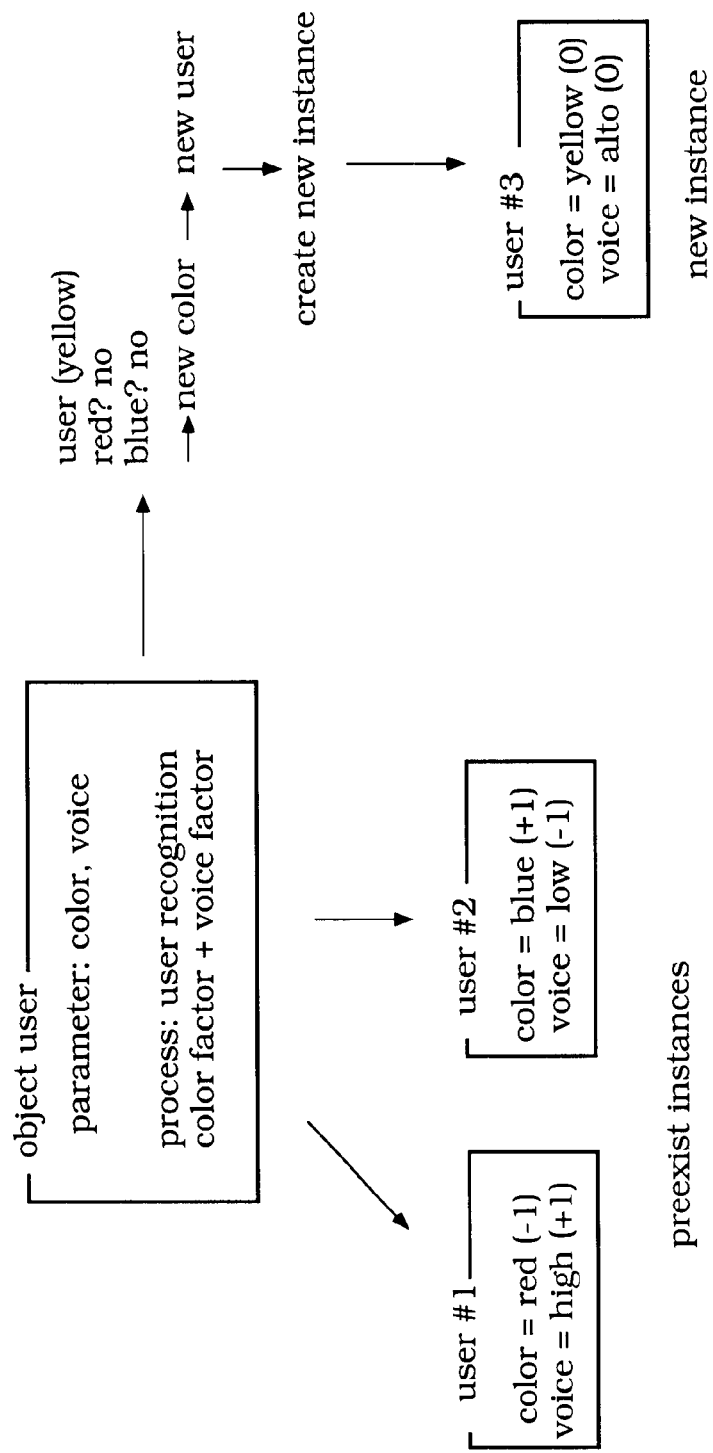
FIG. 8 is a diagram showing an embodiment of schematic processes of JAVA in the present invention.

By using object-oriented languages such as JAVA and C++, the number of objects of concern can be increased autonomously. For example, in JAVA, first, "objects" are defined by "parameters" and "methods", and then, instances are defined based on "parameter" and "method". FIG. 8 is a diagram showing schematic processes of JAVA. In this figure, the "object" is "user", and "user parameters" are "color" and "voice", and "method" is (user parameter× (color+voice)). Here, the program stores two instances; user #1 (color=−1(red), voice=+1(high)), and user #2 (color=+1 (blue), voice=−1(low)). When the device observes user #3 (color=0(yellow), voice=0(intermediate)), the program checks whether user #3 falls within the profiles of user #1 or #2. Here, user #3 is neither red (−1) nor blue (+1), indicating that user #3's color is new which is 0 (yellow). The program creates a new instance under the index of user #3 and defines user #3 by color (0, yellow) and voice (0, intermediate). When the device does not observe an object of concern, the device may select an object which the device is seeing, as an object of concern as explained above. User #3 will be one of objects of concern. That is, when the concern-generating unit selects "play", the program checks whether the object the device is seeing is either one of users #1, #2, and #3. By continuing such experiments, the device stores many objects of concern.

Emotion-Generating Unit

Figure 9:
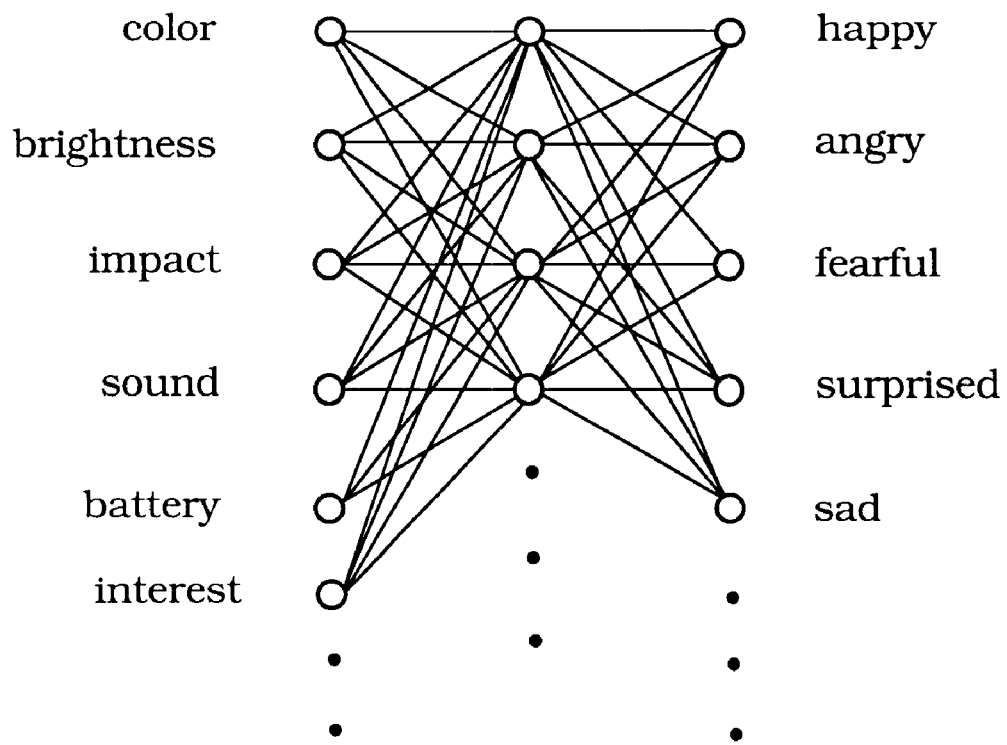
FIG. 9 is a diagram showing an embodiment of an emotion-generating unit using a neural network in the present invention.

Emotions generated by the device may be used for modifying the behavior selected by extracting data from the long-term memory. The emotion-generating unit can be operated by various ways which include a neural network. FIG. 9 is a diagram showing an embodiment of an emotion-generating unit using a neural network. The structure of the neural network in FIG. 9 is similar to that indicated in FIG. 6. The difference is that this neural network uses signals from the concern-generating unit as one of the inputs. Alternatively, the output from the neural network can be multiplied by signals from the concern-generating unit. The input-output relationship of the neural network may be regulated in advance by off-line training, although the neural network can be established off-line or on-line. If it is conducted on-line, output of the device is fed back to the control system, and coupling coefficients can be adjusted. Further, coupling coefficients can be modified using evolutionary computing technology such as genetic algorithms and genetic programming. However, if on-line establishment is conducted, a "training" period will be required.

For establishing an emotion generation system, the technology disclosed in U.S. patent application Ser. No. 09/059, 278, filed Apr. 13, 1998, by Tamiya, et al., entitled "CONTROL SYSTEM FOR CONTROLLING OBJECT USING PSEUDO-EMOTIONS GENERATED IN THE OBJECT", can be adapted to the present invention. The reference is hereby incorporated herein as reference. In the above, each emotion-parameter is defined by a facial expression which the robot can output, and teacher data are not required to establish the neural network if output evaluation can be conducted by using reward signals (e.g., being caressed) or penalty signals (e.g., being hit), instead of teacher data.

Further, the emotion-generating unit can be constituted by a multi-dimensional map defined by the recognized signals and the emotion-parameters.

For a very simple model, the input-output relationship in the emotion-generating unit can be simplified by directly relating recognized signals with emotions. For example, if the device is "hit", the device is "sad"; if the device is softly "touched", the device is "happy"; if the device is "low in power", the device is "angry"; if the device hears "loud sound", the device is "surprised", etc.

Date Stored in Memory

In the present invention, the device's behavior is selected based on the recorded variations in the concerns which may compensate for the current variations in the concerns. The variations in the concerns are extracted from the long-term memory. If the device has concern-parameters ($C_n$) initially; and predetermined standards for the concern levels are (SC), variations in its needs are ($SC-C_n$). If a situation relevant to the current situation is found in the long-term memory, the control system checks if an event compensates for ($SC-C_n$). If information on variations in its concerns ($\Delta C'_{n-1}$) is found in the memory under the index of the situation ($\{\Delta C'_{n-1} - (SC-C_n)\} >$ predetermined level), "behavior" is extracted from the memory. As a result, the device behaves accordingly (if there is no modification by emotions). If consequent variations in the concerns are $\Delta C_n$, the long-term memory can be updated in various ways.

Figure 10:
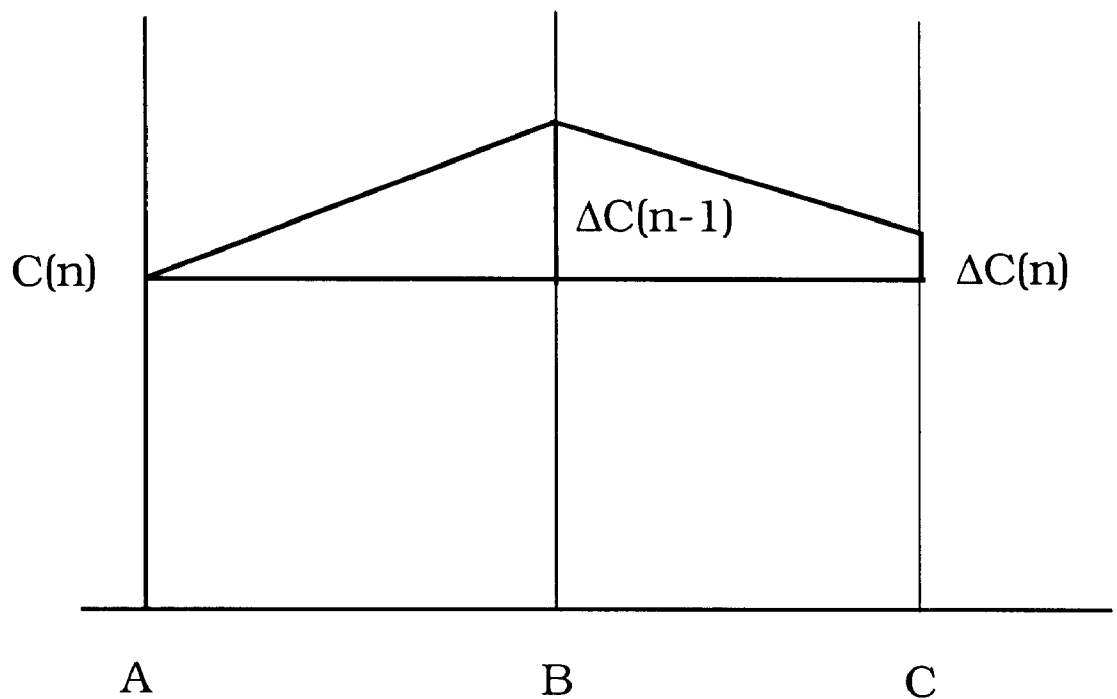
FIG. 10 is a diagram showing an embodiment of changes in emotions in the present invention.

FIG. 10 is a diagram showing an embodiment of changes in emotions. $\Delta C_n$ can be saved in the long-term memory in various ways and when the device next encounters the situation (#n+1), the variations of concerns are extracted from the long-term memory in the form of $\Delta C'_n$. If the long-term memory has a plurality of columns for one situation and adds a new column for new data, $\Delta C'_n$ can be:

$$\Delta C'_n = \Sigma \Delta C_n / n$$

$$\Delta C'_n = \Sigma (\Delta C_n \times \lambda) / n (\lambda \text{ is a time factor})$$

$\Delta C'_n$ can be simply the average of $\Delta C_n$ or the average of $\Delta C_n$ multiplied by $\lambda$. $\lambda$ is a coefficient which is a fiction of n so that the older the memory, the less the contribution becomes. If the long-term memory has one column for one situation, $\Delta C'_n$ can be:

$$\Delta C'_n = \Delta C_n$$

$$\Delta C'_n = \alpha \Delta C_n + (1-\alpha) \Delta C'_{n-1} \ (0 < \alpha < 1)$$

In the above, the long-term memory does not need to have a large memory capacity because one column is sufficient for one situation. The first equation is the same as the second equation when $\alpha=1$. If $\alpha=1$, the precedent data will be abandoned and the data cannot be cumulative. If $\alpha=0.1-0.2$, the data in the past can be used and modified effectively based on the current experience. The influence of the current experience is not large, and the device's behavior will change gradually. By changing $\alpha$, the significance of the current experience can be adjusted.

If the tendency of concern changes is considered to be important, $\Delta C'_n$ can be:

$$\Delta C'_n = \Delta C_n - \Delta C'_{n-1}$$

Figure 11:
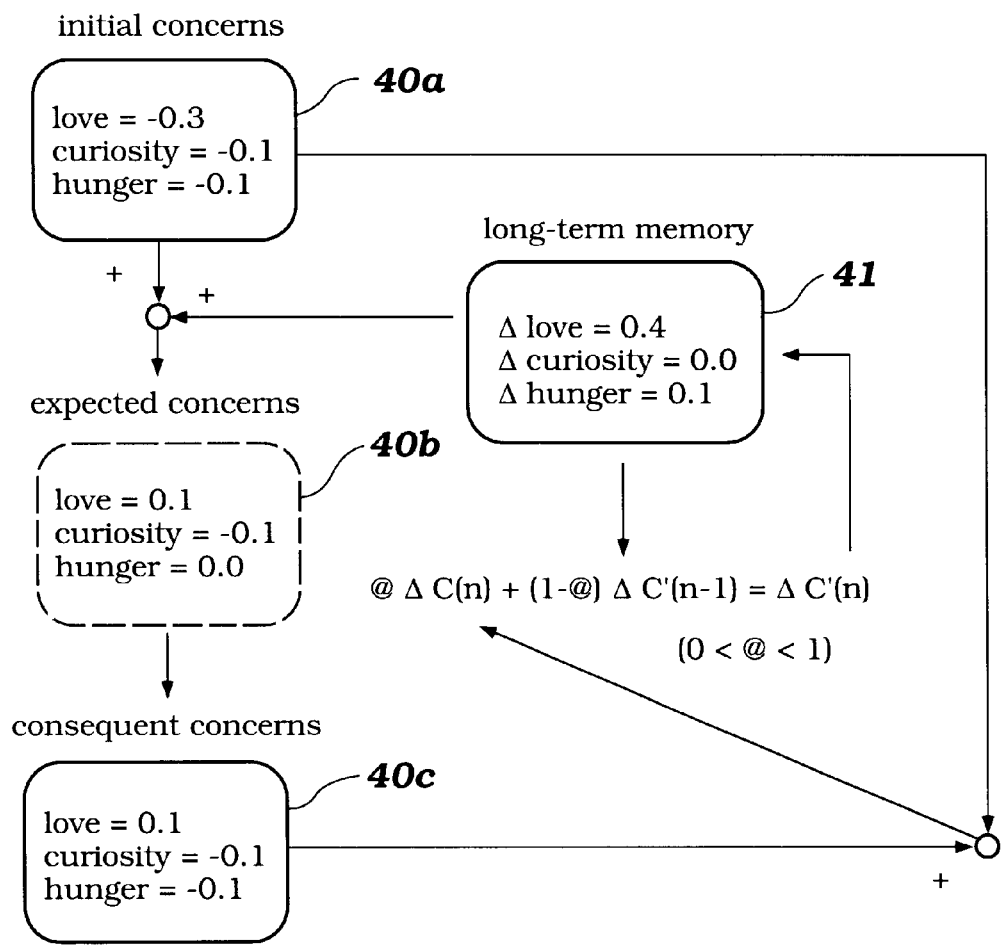
FIG. 11 is a diagram showing an embodiment of data-storing processes under the rule, $\Delta C'_n = \alpha \Delta C_n + (1-\alpha) \Delta C'_{n-1}$ ($0 < \alpha < 1$) in the present invention.

FIG. 11 is a diagram showing an embodiment of data storing processes under the rule, $\Delta C'_n = \alpha \Delta C_n + (1-\alpha) \Delta C'_{n-1}$ ($0<\alpha<1$). In the figure, the working memory has a data sheet 40a indicating LOVE −0.3, CURIOSITY −0.1, and HUNGER −0.1, as initial concerns ($C_n$, wherein $C_n=C_{n1}, C_{n2}, \ldots$). The long-term memory has a spreadsheet 41 indicating LOVE 0.4, CURIOSITY 0.0, and HUNGER 0.1, as variations in the concerns ($\Delta C'_{n-1}$), which update $C_n$ (data sheet 40b). The data sheet 40b indicates LOVE 0.1, CURIOSITY −0.1, and HUNGER 0.0, as modified concerns ($C_n+\Delta C'_{n-1}$) (The modified concerns need not be simply ($C_n+\Delta C'_{n-1}$) but can be a function of $C_n$ and $\Delta C'_{n-1}$). To expect the modified concerns to be realized, the device is actuated and consequently, variations in the concerns occur (data sheet 40c). The data sheet 40c indicates LOVE 0.1, CURIOSITY −0.1, and HUNGER −0.1, as consequent concerns ($C_{n'}$). The variations in the concerns after actuation of the device are $\Delta C_n (\Delta C_n = C_{n'} - C_n)$. $\Delta C_n$ is LOVE 0.4, CURIOSITY 0.0, and HUNGER 0.0. The rule, $\Delta C'_n = \alpha \Delta C_n + (1-\alpha)\Delta C'_{n-1}$, is used, wherein $\alpha=0.1$. Variations in the concerns to be saved in the long-term memory ($\Delta C'_n$) are LOVE 0.4, CURIOSITY 0.0, and HUNGER 0.09, which update the long-term memory. When variations in the concerns can be compensated for by $\Delta C'_n$, the situation will be retrieved and the device will behave accordingly.

Behavior-Planning Unit

Figure 12:
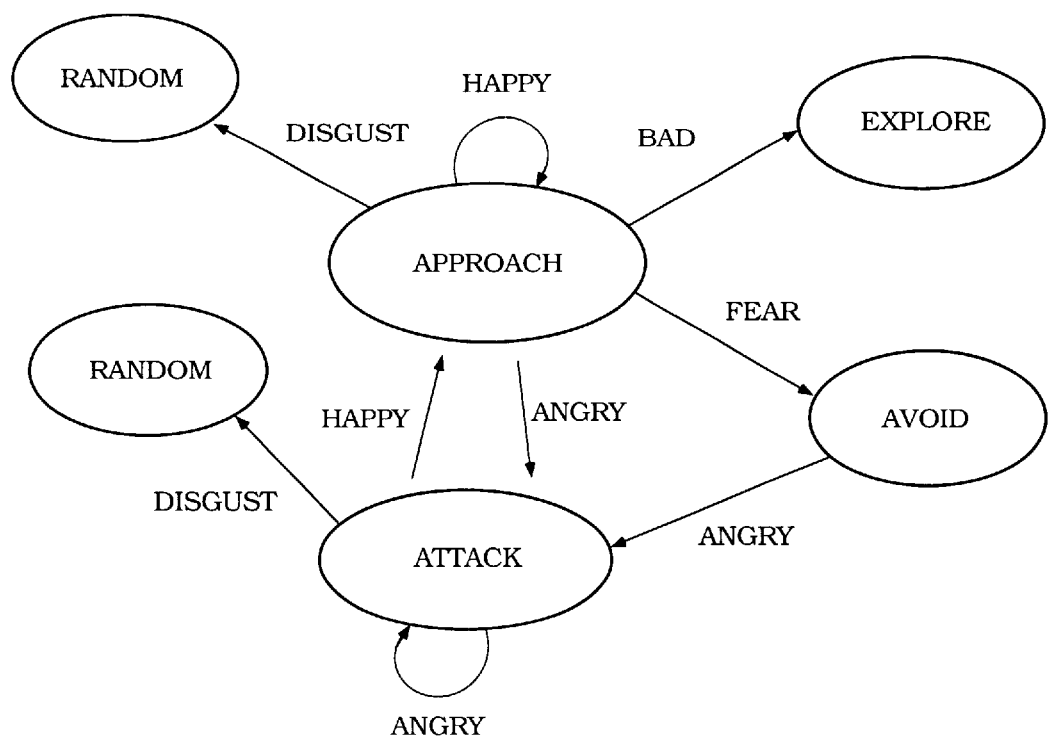
FIG. 12 is a diagram showing an embodiment of behavior patterns in the present invention.

FIG. 12 is a diagram showing an embodiment of behavior patterns. As a result of variations in the concerns, behavior will be selected by finding an event to best compensate for the variations. The selected behavior can be modified by variations in its emotions. That is, the device's behavior is modified in accordance with the variations in the emotions. If the initial behavior is "APPROACH", when the device raises an "ANGRY" score, the behavior is changed to "ATTACK"; when the device raises a "FEAR" score, the behavior is changed to "AVOID"; when the device raises a "DISGUST" score, the behavior is changed to "RANDOM"; when the device raises a "SAD" score, the behavior is changed to "EXPLORE"; when the device raises a "HAPPY" score, the behavior is not changed, but may be more active (faster movement). If the initial behavior is "ATTACH", when the device raises a "HAPPY" score, the behavior is changed to "APPROACH"; when the device raises a "DISGUST" score, the behavior is changed to "RANDOM"; and when the device raises an "ANGRY" score, the behavior is not changed, but may be more active (faster movement). When the device avoids the object, the device raises an "ANGRY" score (run away is not successful), the behavior is changed to "ATTACK". In the long-term memory, the action which is actually performed is recorded and linked with the other data under the index of the situation.

These behavior patterns can be established by a neural network by regulating the input-output relationship or by a multi-dimensional map. Further, coupling coefficients of the neural network can be modified using evolutionary computing technology such as genetic algorithms and genetic programming. However, if on-line establishment is conducted, a "training" period will be required. For establishing behavior patterns, the technology disclosed in U.S. patent application Ser. No. 09/059,278, filed Apr. 13, 1998, by Tamiya, et al., as described above, can be adapted to the present invention. The reference is hereby incorporated herein as reference.

Further, the behavior-planning unit can be constituted by a multi-dimensional map defined by the generated concern-parameters and the generated emotion-parameters. In the above, if the device has a plurality of moving parts, all moving parts can be allocated on a multi-dimensional map. This approach can be used in combination with a neural network, wherein a multi-dimensional map is connected downstream of the neural network. For example, sensed signals, emotion-parameters, and concern-parameters (these data are stored in the working memory) are used as input signals of the neural network. "APPROACH", "ATTACK", "EXPLORE", "AVOID", "RANDOM", "STILL", etc. are outputted from the neural network. Training the neural network can be conducted off-line. Downstream of the neural network, a multi-dimensional map is connected, which regulates the output in such a way, for example, that if "APPROACH" 0.1 and "EXPLORE" 0.3, the device slowly moves toward the object with a tail slowly moving. Not only the neural network but also the map can be modified by using evolutionary computing technology. Evolutionary reinforcement learning methods does not require teacher data. Evaluation functions can be obtained by using reward signals (e.g., being caressed) or penalty signals (e.g., being hit), instead of teacher data.

Figure 13:
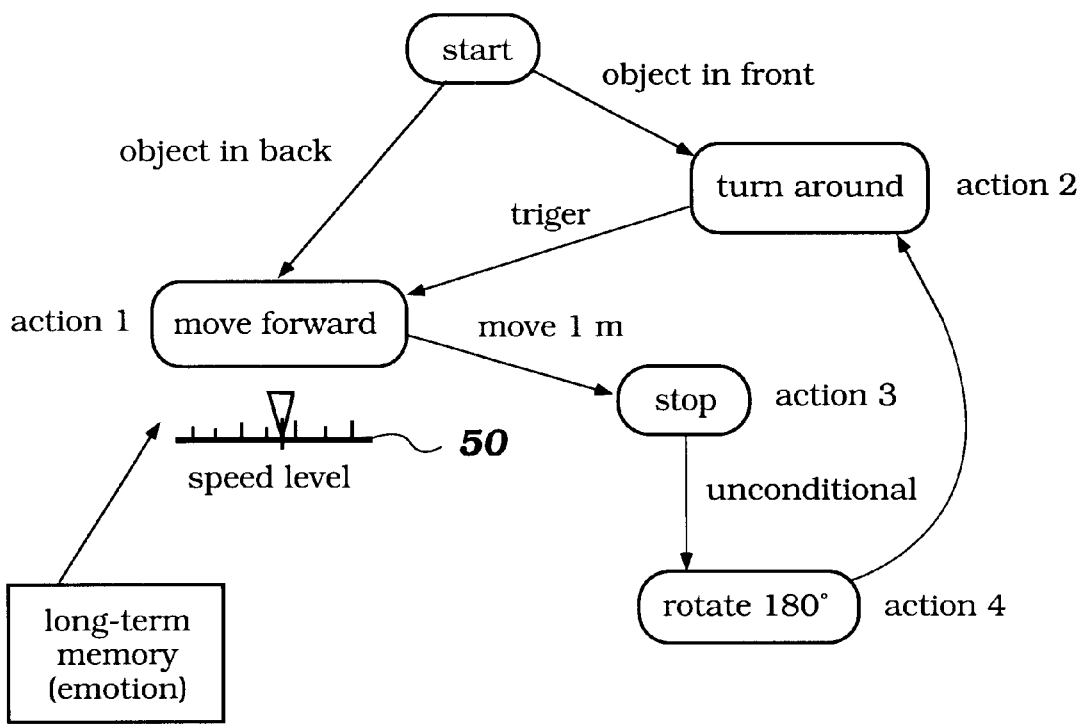
FIG. 13 is a diagram showing an embodiment of a behavior control system in the present invention.

FIG. 13 is a diagram showing an embodiment of a behavior control system. The behavior-planning unit can have a plurality of modules, each regulating one action. The modules can be selected by using technology described above. Each module commands the device's movement sequentially on conditions of the external and internal conditions. FIG. 13 shows an embodiment of a "RUN AWAY" module. If the object is behind the device, the device moves forward (action 1). If the object is in front of the device, the device turns around (action 2). If predetermined conditions are satisfied, action 1 (moving forward) is triggered from action 2. A trigger may be defined by the distance from the object, the moving speed of the object and its direction, the intensity of sound the object is making, the absence of obstacles, etc. The trigger can be determined based on theoretical sum of all of the conditions, each having a trigger range. If the device moves a certain distance, the device stops (action 3). If the device stops, the device turns at 180 degrees without condition (action 4). If the object is close to the device, action 2 is triggered. If the object is not close to the device, the series of actions end. In the above, each action is constituted by a sub-module. Each sub-module can include emotion-parameters. For example, the module for action 1 (moving forward) can be programmed to change the moving speed in accordance with emotion-parameters. If a "FEARFUL" score is high, the device moves faster than when the score is low. If the device moves away from the object, but the device is hit by the object, the "FEARFUL" score becomes high. These data are transferred to the working memory and update the data sheet. The data are saved in the long-term memory. Subsequently, when the device faces the same situation and extracts the data from the long-term memory, the sub-module for action I receives a signal to raise the moving speed (50). As described above, the spreadsheet in the long-term memory, the data sheet in the working memory, and the action modules can be modified based on the user's preferences.

Other Features

In the above, if the device does not have sufficient capacity (processing capacity, data storing capacity), the connected toy can be connected to an external system (computer) through cordless networks. That is, the data and/or programs used in the present system, including the long-term memory, the working memory, the emotion-generating unit, the concern-generating unit, and the behavior-planning unit, can be saved or installed in a separable medium such as a compact disc (ROM or RAM) or IC card, so that the user can implant the information in another device. In addition, the data and/or programs can be transmitted to another device via communication means. By using the above technology, plural memory media of plural devices can be hybridized or cross bred to create a new system. The data can be pooled from plural devices and installed into a new device which will possess an extensive memory even if the new device has never been used. By changing the programs, behavior patterns of the device can be changed. Further, any one or more of the intelligent portions of the device including the recognition unit, the emotion-generating unit, the concern-generating unit, and the behavior-planning unit can be installed in a main computer separately from the device, wherein a network is established between the main computer and the device via, for example, the Internet, so that the device can be made compact, and which may need to have simply sensing units, an output unit, and a communication unit for contacting the main computer. Through the sensing units of each device, it is possible to monitor the user or the external environment of each device, by use of the main computer. Further, each device can be connected to other devices to establish a network of devices to exchange information.

Other Aspects

In the present invention, correlations between various inputs and various outputs of the control system can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any technique.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

Further, the evolutionary computing includes a multi-agent system which is used for competitive co-evolution (Tamashiro, et al., "Study about the performance of competitive co-evolution in multi-agent system", Technical Report of the Institute of Electronics, Information and Communication Engineers, NS99-16 (1999-06), pp. 37–41).

Further, in the above, neural networks may be used for learning control rules. However, a CMAC (Cerebellar Model Arithmetic Computer) can also be used. The CMAC is excellent in terms of additional learning and the high speed of learning, as compared with the hierarchical neural network.

Other Applications

In the above, the device may be a personal robot, toy robot or robot pet.

However, the device of the present control system is not limited to a toy robot, and can be any given control which can be used in a vehicle, an auxiliary drive of a bicycle, or wheelchair, or an industrial robot.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method for adjusting behavior of a device based on the device's experience, said device comprising: (i) a sensing unit for sensing signals; (ii) a concern-generating unit programmed to generate concern-parameters; (iii) an actuating unit for actuating the device; and (iv) a memory storing a spreadsheet composed of multiple sets of data, each set corresponding to a discrete event which the device experienced, said event being defined by signals received by the device, variations in its concern-parameters, and behavior of the device, said method comprising the steps of:
(a) sensing signals receivable by the device; said device having concern-parameters ($C_i$) (i=entry number or time) which vary from predetermined standards (SC);
(b) selecting and extracting from the memory an experienced event, if any, to best compensate for the variations in its concern-parameters; and
(c) actuating the device based on the extracted information, and then computing variations in its concern-parameters ($\Delta C_i$), thereby updating the spreadsheet.

2. The method according to claim 1, wherein the device further comprises an emotion-generating unit programmed to generate emotion-parameters, and wherein, in step (a), the device has variations in its emotion-parameters, and in step (c), behavior of the device extracted from the memory is modified by the variations in its emotion-parameters under predetermined rules.

3. A method for adjusting behavior of a device based on the device's experience, said device comprising: (i) a sensing unit for sensing signals; (ii) a concern-generating unit programmed to generate concern-parameters; (iii) an actuating unit for actuating the device; and (iv) a memory storing a spreadsheet composed of multiple sets of data, each set corresponding to an event defined by signals received by the device, variations in its concern-parameters, and behavior of the device, said method comprising the steps of:
(a) sensing signals receivable by the device; said device having concern-parameters ($C_i$) (i=entry number or time) which vary from predetermined standards (SC);
(b) extracting from the memory an event, if any, to best compensate for the variations in its concern-parameters; and
(c) actuating the device based on the extracted information, and then computing variations in its concern-parameters ($\Delta C_i$), thereby updating the memory, wherein the updated memory stores variations in its concern-parameters ($\Delta C'_i$) linked with the event, wherein $\Delta C'_i = \alpha \Delta C_i + (1-\alpha) \Delta C'_{i-1}$ ($0 < \alpha < 1$), wherein $\Delta C'_{i-1}$ is the previous data saved under the index of the event.

4. The method according to claim 1, wherein, in step (b), if no data on the event is extracted from the memory, the device behaves under predetermined rules.

5. A method for adjusting behavior of a device based on the device's experience, said device comprising: (i) a sensing unit for sensing signals; (ii) a concern-generating unit programmed to generate concern-parameters; (iii) an actuating unit for actuating the device; and (iv) a memory storing a spreadsheet composed of multiple sets of data, each set corresponding to an event defined by signals received by the device, variations in its concern-parameters, and behavior of the device, said method comprising the steps of:
   (a) sensing signals receivable by the device; said device having concern-parameters ($C_i$) (i=entry number or time) which vary from predetermined standards (SC);
   (b) extracting from the memory an event, if any, to best compensate for the variations in its concern-parameters; and
   (c) actuating the device based on the extracted information, and then computing variations in its concern-parameters ($\Delta C_i$), thereby updating the memory, wherein the concern-generating unit comprises a plurality (p) of concern modules, each differently programmed to generate and output the concern-parameter ($C(n)_i$) (n=1–p), and, in step (b), the best compensating event is selected if the relevancy calculated based on the difference between the initial variation ($SC(n)-C(n)_i$) and the recorded variation ($\Delta C'(n)_{i-1}$) in each concern-parameter is higher than a pre-selected score, wherein the relevancy is defined by $\Sigma((SC(n)-(n)_i)-\Delta C'(n)_{i-1})^2$ (n1–p).

6. The method according to claim 1, wherein the input-output relationship of the concern-generating unit is predetermined, said concern-generating unit receiving pre-selected sensed signals and outputting the concern-parameters.

7. The method according to claim 1, wherein the input-output relationship of the emotion-generating unit is predetermined, said emotion-generating unit receiving pre-selected sensed signals and the output of the concern-generating unit, and outputting the emotion-parameters.

8. The method according to claim 1, wherein the input-output relationship of the actuating unit is predetermined, said actuating unit receiving pre-selected sensed signals and the information from the memory, and actuating the device.

9. The method according to claim 1, further comprising a working memory which temporarily pools and stores information from the sensing unit, the concern-generating unit, and the first-mentioned memory until the device completes its action, and which outputs information to the concern-generating unit, the actuating unit, and the first-mentioned memory.

10. The method according to claim 1, wherein the updated memory stores variations in its concern-parameters ($\Delta C'_i$) linked with the event, wherein $\Delta C'_i = \alpha \Delta C_i + (1-\Delta) \Delta C'_{i-1}$ ($0 < \alpha < 1$), wherein $\Delta C'_{i-1}$ is the previous data saved under the index of the event.

11. The method according to claim 1, wherein the concern-generating unit comprises a plurality (p) of concern modules, each differently programmed to generate and output the concern-parameter ($C(n)_i$) (n=1–p), and, in step (b), the best compensating event is selected if the relevancy calculated based on the difference between the initial variation ($SC(n)-C(n)_i$) and the recorded variation ($\Delta C'(n)_{i-1}$) in each concern-parameter is higher than a pre-selected score, wherein the relevancy is defined by $\Sigma((SC(n)-C(n)_i)-\Delta C'(n)_{i-1})^2$ (n=1–p).

* * * * *